United States Patent [19]

Khanna

[11] 4,168,256
[45] Sep. 18, 1979

[54] PVC MOLDING COMPOSITION

[75] Inventor: Sarwan K. Khanna, Indianapolis, Ind.

[73] Assignee: RCA Corporation, New York, N.Y.

[21] Appl. No.: 869,129

[22] Filed: Jan. 13, 1978

[51] Int. Cl.$^2$ .................. C08L 27/06; C08L 31/04; C10M 00/00
[52] U.S. Cl. .............................. 260/33.2 R; 526/209; 526/330; 526/344; 526/345
[58] Field of Search ............ 260/33.2 R; 526/209, 526/202, 344, 345, 330

[56] References Cited

U.S. PATENT DOCUMENTS

| | | | |
|---|---|---|---|
| 2,393,512 | 1/1946 | Bent et al. | 260/33.2 R |
| 2,657,186 | 10/1953 | Klein et al. | 260/33.2 R |
| 2,668,801 | 2/1954 | Schultz | 260/33.2 R |
| 2,958,669 | 11/1960 | Hoffmann | 260/33.2 R |
| 3,385,912 | 5/1968 | Harris | 526/209 |
| 3,856,739 | 12/1974 | Nelson | 260/33.2 R |
| 3,933,709 | 1/1976 | Aron | 260/33.2 R |

FOREIGN PATENT DOCUMENTS 2244922 3/1973 Fed. Rep. of Germany ..... 260/33.2 R
7015517 11/1966 Japan ........................................ 526/209

OTHER PUBLICATIONS

Product Data, "Poly G55 Series Polyols", Olin Corp., 1976, 1977, [55–112; 55–56; 55–28; 55–37].

*Primary Examiner*—Herbert J. Lilling
*Attorney, Agent, or Firm*—Birgit E. Morris

[57] ABSTRACT

Compounds of the formula

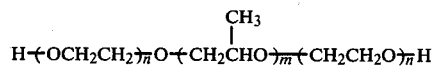

wherein n independently at each occurrence and m are integers are excellent lubricants for PVC molding compositions.

4 Claims, 2 Drawing Figures

PVC MOLDING COMPOSITION

This invention relates to improved molding compositions. More particularly, this invention relates to polyvinyl chloride molding compositions containing an improved lubricant.

BACKGROUND OF THE INVENTION

Polyvinyl chloride (PVC) homopolymers and copolymers are the most widely employed polymers in industry and can be used for many products, from thin surgeon's gloves to rigid durable pipe. Various additives can be added to PVC to provide processability and those melt characteristics required for a particular process. For example, stabilizers, plasticizers, processing aids and lubricants are generally added to molding compositions, as well as desired colorants and fillers.

Lubricants are added to PVC to modify the melt viscosity and melt flow properties during processing. The most commonly employed lubricants include waxes, metal soaps of fatty acids and fatty esters. Lubricants that are somewhat soluble in PVC and lower the apparent melt viscosity and reduce internal shear, with its consequent generation of heat, are referred to as internal lubricants. Lubricants that are insoluble in PVC and form a thin layer around the PVC particles, reducing adhesion of the polymer to processing equipment and reducing internal heating, are referred to as external lubricants.

Internal lubricants for PVC must have a low molecular weight, i.e., less than about 7,000, a melting point within the processing temperature range, some solubility in the polymer, and have a nonpolar hydrocarbon chain in the molecule which acts as a lubricant layer.

Since lubricants are generally imcompatible with PVC, any excess lubricant present bleeds out of the resin and collects at the surface of the molded article, causing staining and other side effects. Thus the least amount of lubricant will be employed in a molding composition that can adequately perform the lubricant required.

For the record industry, a particular type of room temperature solid esterified montan wax, such as Wax E of the Hoechst Company, is employed worldwide as the lubricant for compression molding of records and is regarded as the most effective lubricant known to date. It is generally employed in amounts of about 0.4–0.5 percent by weight of the total resin composition. A more effective lubricant would be desirable.

SUMMARY OF THE INVENTION

Improved PVC molding compositions containing ethylene oxide-capped polyether polyols as lubricants have been discovered. These lubricants can be employed in small amounts to impact excellent melt processability to PVC polymer molding compositions.

DETAILED DESCRIPTION OF THE INVENTION

Figure 1:
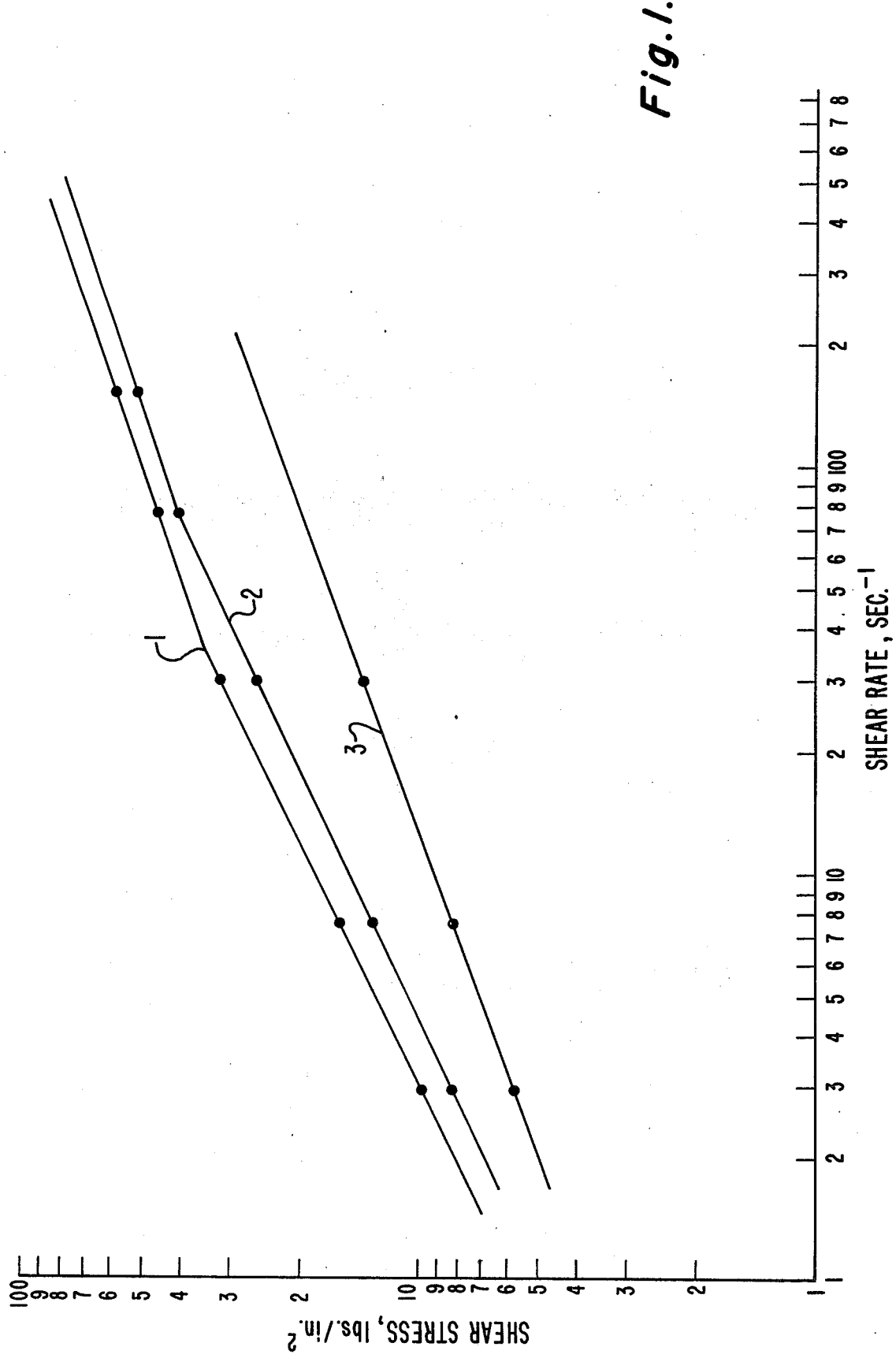
FIGS. 1 and 2 are graphs of shear stress versus shear rate for various PVC molding compositions.

The lubricants of the present invention are ethylene oxide-capped polyether propylene glycol block copolymers having a molecular weight in the range of about 4000 and having a viscosity at 25° C. of about 1000 centistokes. They have the general formula

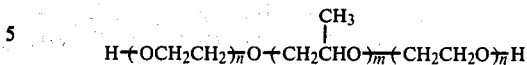

wherein n independently at each occurrence and m are integers.

In addition to the above described lubricants, other known lubricants can also be added to polyvinyl chloride molding compositions. For example, a room temperature solid monofatty acid ester of varying molecular weight alcohols and acids, commercially available as Loxiol G30 from Henkel International GmbH, can be added advantageously. Preferably, a poly functional acid-alcohol type ester wax available as Loxiol G70 can also be employed. These lubricants can be employed separately or in combination. Preferably, about 0.25–0.75 percent of the Loxiol G30 lubricant and from about 0.1–0.5 percent of Loxiol G70 lubricant will be added. The total amount of lubricant added can vary between about 0.2–1 percent by weight of the molding composition.

The above described lubricants are suitable for use with thermoplastic vinyl polymers, particularly PVC homopolymers and copolymers with monomers such as vinyl aetate, ethylene and propylene, for example, and mixtures of the above with copolymers of PVC and maleate esters. Commercially available polymers include a vinyl chloride copolymer containing about 9–15 percent by weight of vinyl acetate, a copolymer of vinyl chloride containing about 25 percent by weight of a maleate ester, vinyl chloride containing about 6–8 percent by weight of propylene and the like.

In order to obtain processable molding compositions, various additives must be added to the PVC resin in addition to the lubricants, including stabilizers, plasticizers and processing aids. In addition, fillers and colorants can also be added and in some cases, UV stabilizers, flame retardants, fungicides and blowing agents are also added.

Stabilizers prevent degradation reactions during processing due to the elevated temperatures generated and are well known. Generally organometallic salts based on tin, lead, barium-cadmium, calcium and zinc are useful including dibutyltin-$\beta$-mercaptopropionate, dibutyltin maleate, barium, cadmium and/or lead stearate complexes and the like. The stabilizers act primarily to neutralize the volatiles formed as decomposition products during processing of the PVC resins, particularly hydrogen chloride vapor. Thus, a sufficient amount of stabilizer must be added to prevent hydrogen chloride evolution, but without adding more than can be adequately absorbed by the resin. In general from about 1–3 percent by weight of the total molding composition of one or more of the stabilizers will be employed.

Plasticizers are added to impart flexibility to the molded vinyl composition and to provide a lower melt viscosity to the mixture during blending, which reduces the internal friction of the material during the molding process. Commonly employed plasticizers include phthalate, phosphate, adipate and azelate esters, as well as epoxidized oils. Suitable plasticizers include, for example, diisooctylphthalate, glycerol tribenzoate, and epoxidized soybean oil having a molecular weight of about 1000. Chlorinated paraffin waxes can also be used.

The amount of plasticizer employed depends on the rigidity required in the final product. For the record industry, about 0.5 percent by weight of the resin composition is suitable. For flexible cable applications, amounts of up to about 72 parts by weight for 100 parts by weight of PVC resin is employed.

Processing aids are added to increase the melt strength during processing and molding operations and to reduce the melt viscosity and elasticity of the molding composition. Commonly employed processing aids include styrene-acrylonitrile resins and methylmethacrylate copolymers such as polymethylmethacrylate resins available from the Rohm & Haas Company. The amount of processing aid added is generally in the range of between 2 to 10 percent of the total molding composition.

Standard molding compositions containing the lubricants of the present invention have improved mold release characteristics, which save time in manufacture and thus decrease costs while increasing productivity in automatic presses. Lower blending temperatures can be employed during processing, thus reducing any danger of degradation or decomposition of the ingredients of the molding composition. Further, since less lubricant need be employed, less bleed out or inhomogeneities in the surface of the molded article are encountered.

The present molding compositions can be prepared by mixing all of the solid ingredients first in a high shear blender, such as a Henschel mixer, until the temperature reaches about 120° F. (49° C.) and then adding the liquid ingredients and continuing mixing until the temperature reaches about 160° F. (71° C.). The dry blended molding composition can be used directly, or more generally is charged to a plasticating mixer, such as an extruder or Banbury mixer, which melts the composition. The melt is cooled to solidify it, and pelletized or granulated for storage. The pellets or granules are then extruded to remelt the composition for compression molding, or fed directly to a screw injection molding machine where it is melted, mixed and molded in one automated operation. The molded articles prepared have excellent resolution of fine details and have excellent mold release properties. The molded articles can also be made by compression molding in conventional manner, e.g., forming a pre-form, compression molding using a 60 second cycle at about 325°–340° F. (163°–171° C.) and removing the flashing.

The invention will be further illustrated by the following Examples, but it is to be understood that the invention is not meant to be limited to the details disclosed therein. In the Examples parts and percentages are by weight.

EXAMPLE 1

A conductive molding composition was prepared by mixing the following ingredients in a Henschel mixer: 62.2 parts of vinyl chloride copolymer containing 8 percent of propylene, AP-480, available from Air Products and Chemicals Inc.; 15 parts of a vinyl chloride-25 percent maleate ester copolymer, FPC-471, commercially available from the Firestone Company; 2 parts of dibutyltin-$\beta$-mercaptopropionate, T-35, commercially available from M & T Chemical Company, Inc.; two parts of a polymethylmethacrylate processing aid, K-147, from the Rohm & Haas Company; 0.75 part of Loxiol G-30, a monofatty acid ester available from Henkel International; and 0.25 part of Loxiol G-70, also a product of Henkel International; 0.3 part of G55-28, a copolymer having the structure of formula (1) hereinabove, a molecular weight of about 4000 and a viscosity of about 1000 centistokes at 25° C. available from Olin Corporation; 15 parts of Ketjenblack EC carbon black of the Armak Company; and 2.5 parts of diisooctylphthalate plasticizer available from the Monsanto Company as 711.

The above ingredients blended well and did not stick to the hot, mixing rollers.

Video discs were compression molded at 330° F. (165° C.) using a 60 second cycle with a metal stamper described by Clemens in U.S. Pat. No. 3,842,194. Good discs were obtained.

EXAMPLE 2

A blend was made of the following ingredients: 20 parts of a copolymer of vinyl chloride containing 9 percent of vinyl acetate; 1.1 parts of a stabilizer of a metal stearate complex available commercially as Mark Q-232B from the Argus Chemical Corporation; 0.2 part of carbon black colorant, Monarch 1100, from the Cabot Laboratories; varying amounts of lubricants as described below, and the balance to make 100 parts of a vinyl chloride-vinyl acetate copolymer containing 15 percent of vinyl acetate available as VYHH from Union Carbide Corporation.

In sample A, no lubricant was added as a control. Sample B contained 0.2 part of G55-28 lubricant of the invention and sample C contained 0.4 part of G55-28.

The samples were charged to a Brabender Plasticorder and the time of fluxing measured. The rotation speed was set at 45 rpm and the compositions mixed at 275° F. (135° C.).

The times of fluxing are summarized below.

| Samples | Time for Fluxing, Secs. |
| --- | --- |
| A | 18.5 |
| B | 31 |
| C | 51 |

Thus, increased amounts of the present lubricants increases the time of fluxing and increases the melting point of the molding composition.

CONTROL

The procedure of Example 2 was followed except substituting lower molecular weight polyols as the lubricant; one having a molecular weight of 3000 and a viscosity of 500, and another having a molecular weight of 2000 and a viscosity of 400. Over 5 percent by weight of each of these lubricants were required to obtain the lubricating qualities desired, but at such high loadings excessive staining and bleed out of the lubricants occurred after molding.

EXAMPLE 3

Figure 2:
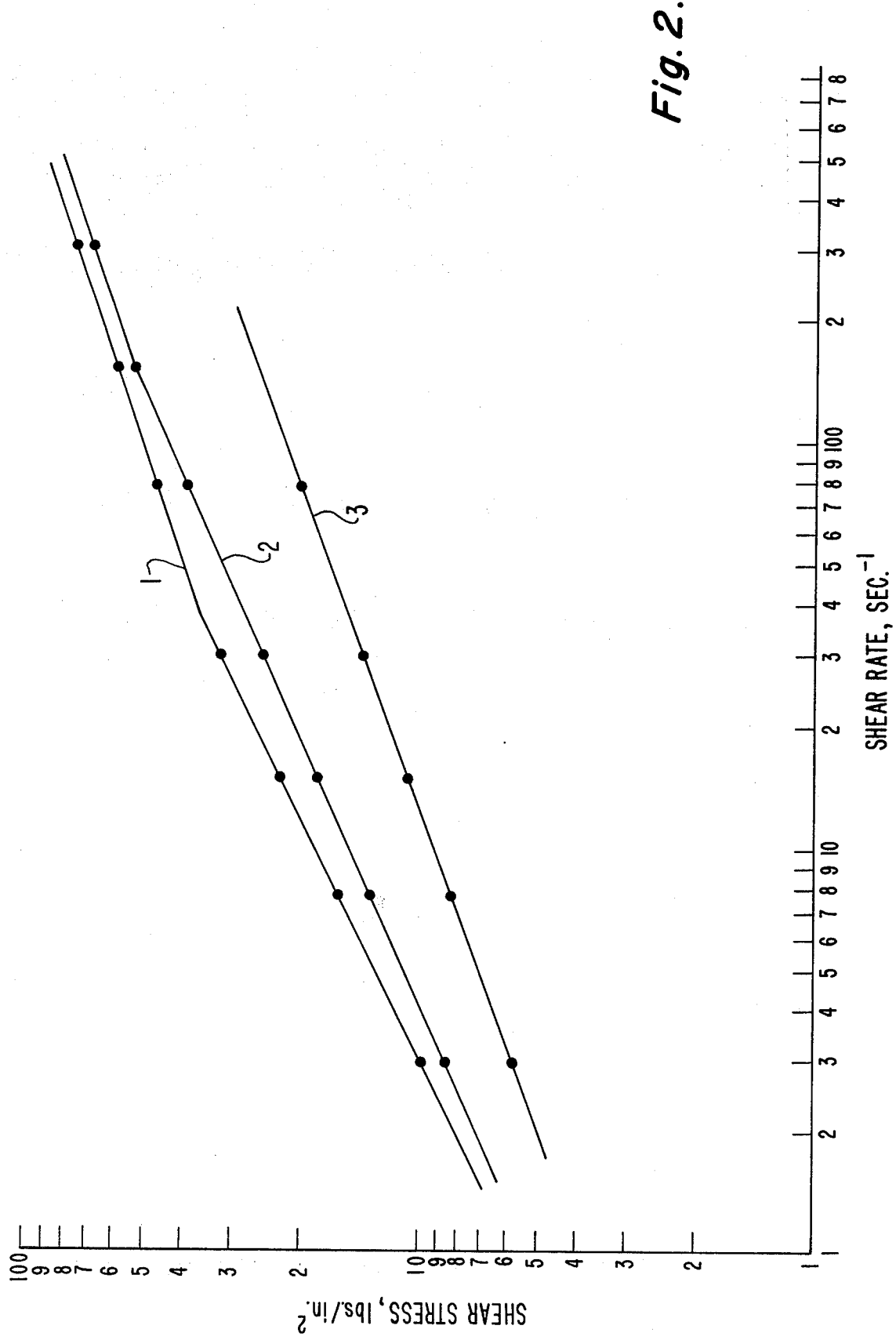

An Instron Capillar Rheometer was employed to measure melt viscosity versus shear rates. The composition of Example 2 was tested at 150° C. FIGS. 1–2 show graphs of shear stress in pounds per square inch versus shear rate.

FIG. 1 shows the effect of different amounts of G55-28 on the melt flow properties. Curve 1 represents the composition containing no lubricant; curve 2 represents the composition containing 0.2 percent of lubricant and curve 3 represents the composition containing 0.4 percent of lubricant. It is apparent that the shear stress is reduced as more lubricant is added.

FIG. 2 shows the effect of different lubricants on the melt viscosity of different molding compositions. Curve 1 represents a composition containing no lubricant; curve 2 represents a composition containing 0.4 percent of Wax E lubricant, a room temperature solid esterified montan wax of the Hoechst Company; and curve 3 represents a composition containing 0.4 percent of the lubricant of the present invention. It is apparent that the present lubricants have the lowest shear stress.

The composition containing 0.4 percent of G55-28 was injection-compression molded to form a 7 inch audio record. The record released well from the mold and a record having good sound characteristics was obtained.

I claim:

1. In a polyvinyl chloride molding composition for molding of discs having audio and/or video information thereon comprising a PVC polymer containing effective amounts of a stabilizer, plasticizer, processing aid and lubricant, the improvement wherein the lubricant includes a compound of the formula

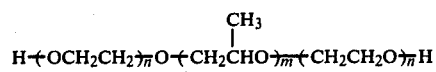

whose molecular weight is in the range of at least about 4000 and wherein n independently at each occurrence and m are integers.

2. A molding composition according to claim 1 wherein the lubricant is present in amounts of from about 0.2 to 1 percent by weight of the molding composition.

3. A molding composition according to claim 1 wherein said lubricant has a molecular weight of about 4000.

4. A method of formulating a molding composition for molding of discs having audio and/or video information thereon including a polymer of vinyl chloride, a stabilizer, a plasticizer, a processing aid and a lubricant which comprises adding a lubricating amount of a compound of the formula

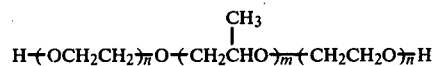

whose molecular weight is in the range of at least about 4000 and wherein n independently at each occurrence and m are integers.

* * * * *